March 17, 1964 J. BECKER 3,125,627
OPTICAL IMAGERY SYSTEM
Filed April 17, 1962 2 Sheets-Sheet 1

INVENTOR
Johannes Becker
by Wenderoths, Lind & Ponack
Attorneys

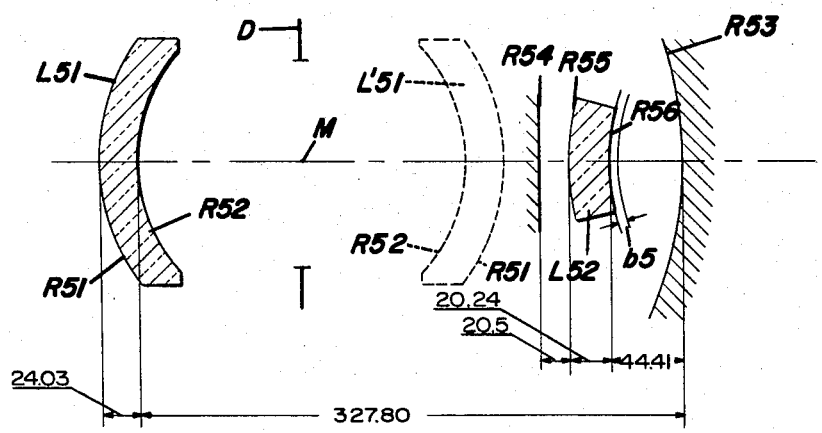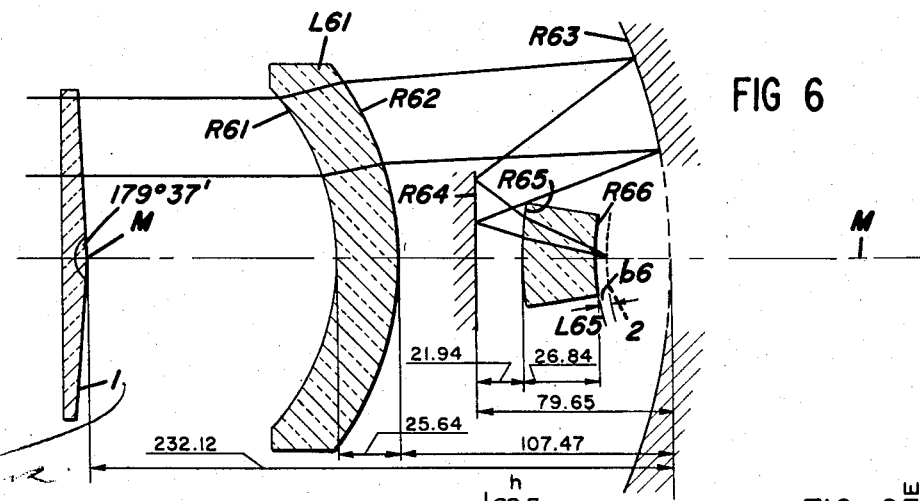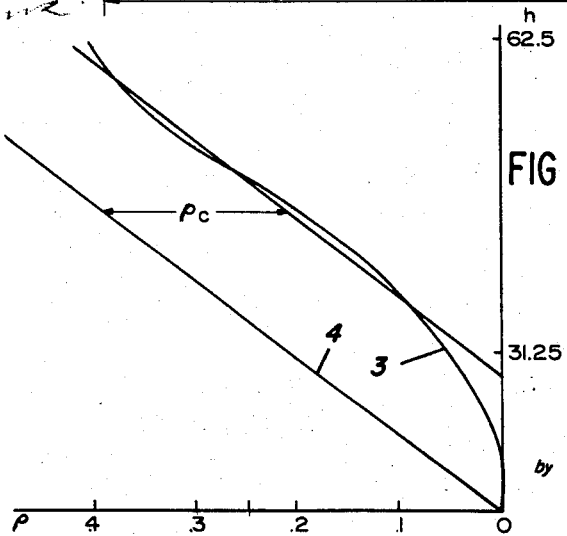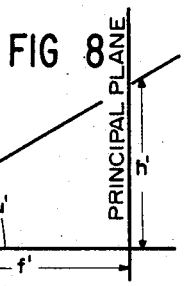

United States Patent Office 3,125,627
Patented Mar. 17, 1964

---

3,125,627
OPTICAL IMAGERY SYSTEM
Johannes Becker, Delft, Netherlands, assignor to N.V. Optische Industrie "De Oude Delft," Delft, Netherlands
Filed Apr. 17, 1962, Ser. No. 188,030
10 Claims. (Cl. 88—57)

This application is a continuation-in-part of my application Serial No. 708,691, filed January 13, 1958, now Patent 3,065,670 granted November 27, 1962 entitled "Optical Imagery System."

The invention relates to an optical system for the imagery of two conjugate surfaces, for photographic, projecting and like purposes, which optical system has for its image-forming element a concave spherical front surface reflecting mirror to which for correcting the spherical aberration an axially spaced negative meniscus lens is added whose concave side is facing the center of curvature of the reflecting mirror and whose surfaces are concentric or substantially concentric with this reflecting mirror. Systems of this kind, referred to as "concentric mirror systems," are disclosed, for instance, in the patent to A. Bouwers, No. 2,492,461, granted December 27, 1949 and have gained great practical importance, especially in cases where a sharply defined image is required in conjunction with exceptionally high luminosity and/or a large focal length. In order to give an idea of the excellent state of correction afforded by these systems it may be mentioned that with a relative aperture of $f/1$ it is possible to obtain a circle of confusion whose diameter is less than 0.5/1000 of the focal length.

The residual aberrations which give rise to this confusion circle are caused by the fact that the over correction for spherical aberration of the concentric meniscus lens and the under correction of the concave mirror can never completely neutralize each other. The ratio of the higher orders of spherical aberration to the spherical aberration of the third order is, in fact, greater for the meniscus lens than for the concave spherical mirror. Therefore, in designing a concentric mirror system of the type referred to it is necessary to aim at a compromise giving an optimum design. The meniscus lens must be selected such that its third order spherical aberration in an absolute sense is less than that of the mirror, so as to avoid that the higher order aberration of the lens results in too great an over-compensation.

In the case of very large apertures the effect of the higher order spherical aberration of the meniscus lens will predominate to such an extent that an acceptable compromise is no longer possible, which means that the zonal errors set a limit to the applications of the system.

By way of elucidation of the foregoing the lateral spherical aberration of a typical concentric mirror system of the type described above has been plotted in FIG. 1 of the accompanying drawing as a function of the height of incidence $h$ of light rays travelling parallel to the optical axis. It can clearly be seen that in a certain zone the higher order aberrations of the meniscus lens cause a sharp bend in the characteristic. The residual error of the objective system under discussion with a relative aperture of $f/0.65$ amounts to 1% of the focal length.

The residual error furthermore depends upon the thickness of the concentric meniscus lens used. For a given corrective effect, that is, for a given negative power, a thicker meniscus has more faintly curved surfaces, so that the higher orders of spherical aberration bear a smaller ratio to the aberration of the third order and hence the ratio of the zonal over correction at the maximum height of incidence, to the over correction at any lower height of incidence is lower for a thick meniscus than for a thin one.

If the meniscus lens is situated between the spherical mirror and its center of curvature, it is of course necessary to avoid positioning of the image in the glass body of the corrector lens. The latter may of course be divided into two components spaced a certain distance apart in such a way that the image is positioned between the two components, or the corrector lens may be selected so that the image is formed at a position in front of the lens, the entire corrector lens thus being traversed twice by the light rays; however, in both cases the total glass thickness of the corrector lens must be very great if a sufficient unobstructed distance between the image surface and the nearest corrector surface is to be obtained. Increasing the thickness of the corrector lens in order to reduce the zonal aberrations is a method which, for various reasons, is not to be recommended. With extremely large apertures even the thickest possible corrector lens introduces too great zonal over corrections. Besides, the thicker corrector lens entails the drawback of a heavier weight of glass and it is difficult to make pieces of optically pure glass of the required dimensions. Moreover, the larger thickness of glass to be traversed by the light rays results in greater absorption of light energy and in larger chromatic aberrations. Lastly, the greater divergence of the beam between the meniscus and the concave mirror necessitates larger dimensions of the mirror, which in turn increases both the cross sectional dimensions of the system and the total weight. This method does not, therefore, provide an acceptable solution of the difficulties mentioned herein before.

Earlier efforts have been made to reduce the residual errors of meniscus-mirror systems in the case of very large apertures. One of these methods consists in adding to the existing type of concentric system a supplementary element which is located at the center of curvature of the mirror and is provided with at least one aspherical refractive surface (Patent No. 2,448,699, granted September 7, 1948 to A. Bouwers). According to another solution a conical lens element likewise mounted at the center of curvature of the mirror is added to the system (as described in Patent No. 2,821,107, granted January 28, 1958 to A. Bouwers).

According to both solutions the improvement effected in the correction of spherical aberration is, however, accompanied by the introduction of a slight astigmatism, owing to the fact that the elements added are not concentric.

According to the invention of my above mentioned previous application Serial No. 708,691 the object in view was achieved by a different means which does not entail any loss of the concentricity of the system. For this purpose a second negative meniscus lens whose surfaces are also concentric or substantially concentric with the reflecting surface of the mirror is incorporated in the system in such a way that it is traversed only by the light rays between the reflecting surface of the mirror and the conjugate surface situated nearest to this reflecting surface. In other words, the second meniscus is situated in the beam at a location where said beam is in the highest degree convergent or divergent.

This second meniscus lens will naturally take over a part of the corrective function of the first one, as a result of which the first meniscus may be weaker. It was found, however, that the contribution made towards correction of the spherical under correction of the concave mirror by a second meniscus lens mounted in the manner described, shows a surprisingly good ratio between higher order spherical aberration and that of the third order. In systems with extremely large apertures, e.g. larger than $f/0.8$, this meniscus lens may even have an under correcting effect of higher orders on the rays with the greatest incidence height, which effect acts in opposition to the excess of over correction of the first meniscus lens and may thus compensate for this excess.

It is the principal object of my present invention to further improve the meniscus-mirror system of the type referred to comprising two meniscus lenses. A more specific object is to minimize by relatively simple and inexpensive means the spherical aberration of large aperture meniscus-mirror systems of the aforesaid type to a degree hitherto unobtainable.

I have found that it is possible to raise the grade of correction of the system having two meniscus lenses in accordance with my previous application Serial No. 708,691 to a very high level in the case of extremely large apertures by adding to the system a conical lense element, that is a plate having at least one surface in the form of a circular cone whose apex angle approaches 180°. For this purpose the system comprising two concentric meniscus lenses is calculated in such a way that, if the central portion of the beam is cut out, as is always the case in axially aligned mirror systems, the light rays emanating from the axial point of the object unite to form an image having substantially the shape of a ring surrounding the optical axis. The constant deviation given to all of the light rays by the conical lens reduces this ring-shaped image to a point on the optical axis. It was found that in a system according to my previous application Serial No. 708,691, comprising two meniscus lenses, this collection of the rays to form a ring-shaped image can be realized with a high degree of precision even in the case of extremely large apertures. Moreover, the diameter of the said ring was found to be comparatively small, so that only a small angle of slope of the conical lens is required. Errors of asymmetry and astigmatism are not, therefore, introduced by the conical lens to an appreciable extent.

The invention will be more fully understood from the following detailed description when read in connection with the drawings in which:

FIGURES 3, 4 and 5 illustrate various optical systems in accordance with the said previous application Serial No. 708,691.

FIGURE 6 is a similar view illustrating a modification in accordance with the present invention wherein a cone lens is used.

FIGURE 7 is a graph illustrating the lateral spherical aberration as a function of the height of incidence for the system according to the invention shown in FIGURE 6, and FIGURE 8 is a diagram for determining the relation between the height of incidence and a reduced height of incidence, defined in the description.

Figure 1:
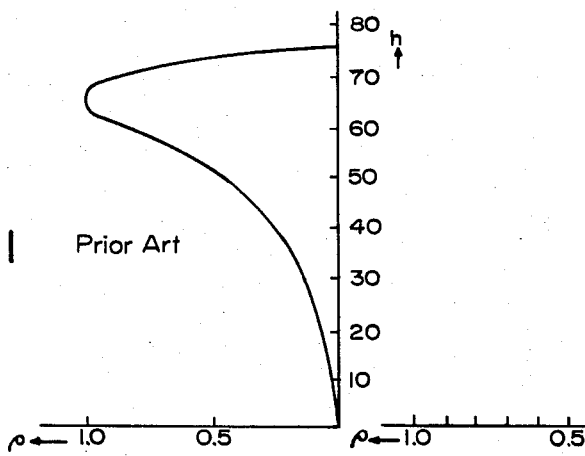
FIGURE 1 is a graph illustrating the lateral spherical abberation of a typical prior art system.
Figure 2:
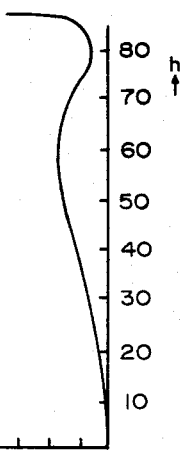
FIGURE 2 is a similar graph showing such aberration of a meniscus-mirror system having two meniscus lenses in accordance with my previous application Serial No. 708,691.

FIGURE 2 shows the curve analogous to FIG. 1, of the lateral spherical aberration of a typical system as described in my previous application Serial No. 708,691. It appears from this graph that the zonal under correction in an optimum design may be much smaller than in a conventional meniscus-mirror system showing a state of correction as given by FIG. 1. On account of the greatly reduced effect of the higher-order overcorrection of the first meniscus lens the portion of the curve between the incidence heights 60 and 80 declines to a much lesser extent in the direction of over correction than is the case in FIG. 1, while at incidence heights over 80 the curve actually shows that the higher order over correction of the second meniscus lens is rapidly decreasing and, eventually, is reversed to under correction so that the curve is bent to the left. The advantage of the second meniscus lens may be said to reside in that this lens has a much lower ratio between the zonal errors at the maximum and at lower heights of incidence, respectively, than the first meniscus lens. Thanks to this advantageous corrective condition the residual error of an objective with $f=100$ and a relative aperture $f/0.6$ is only 0.20, representing a fivefold improvement as compared with the system to which FIG. 1 refers.

In this optical system one is at liberty, to dimension the elements in such a way that the thickness of material traversed by the light rays between the concave mirror and the conjugate surface situated nearest to the mirror is greater than the thickness of the first meniscus lens. It is advantageous to do so, as an increase of the said material thickness results in a further decrease in power (and hence in thickness) of the first meniscus. A weaker (thinner) first meniscus lens is always preferable on account of the saving in weight and the reduction in size of the mirror which is achieved by lesser divergence. The said thickness of material may be furnished either by the second meniscus lens alone or by the second and first meniscus lens together.

In a concentric system in which the first meniscus lens is mounted between the center of curvature of the concave mirror and the mirror itself and thus has its convex side facing the mirror, the thickness of the meniscus will further depend upon the unobstructed distance it is desired to obtain between the conjugate surface situated nearest to the mirror on the one hand and the nearest meniscus lens surface facing such conjugate surface on the other hand. The provision of such an unobstructed space is necessary, for instance, in the case of a camera objective designed to permit the interposition of a roller blind shutter, color filters and similar devices in front of the image surface, which in thise case constitutes the conjugate surface referred to. Calculations have shown that solutions giving satisfaction in every respect can be arrived at if the thickness of the first meniscus lens remains less than $0.3f+b$, where $f$ is the focal length of the system and $b$ the aforementioned unobstructed distance.

With the same embodiment of the concentric system, that is, with the first meniscus lens and the concave mirror mounted on the same side of the center of curvature, it is also advantageous to make the smallest radius of curvature of the second meniscus lens, smaller than the smallest radius of curvature of the first meniscus lens.

This may be achieved, for instance, by cementing the second meniscus lens to the concave surface of the first one or by placing the second meniscus lens in a central perforation of the first in such a way that the second meniscus lens projects in the direction of the center of curvature. The advantage of this embodiment when used in cameras is that the distance between the image surface and the front surface of the first meniscus lens is increased, as a result of which the conveyance of film to and from the image area is not impeded by the edge portions of this meniscus. The smaller distance between the image surface and the meniscus lens surface having the smallest radius of curvature, that is, the front surface of the second meniscus lens has no serious implications as this meniscus lens has a much smaller diameter.

Figure 3:
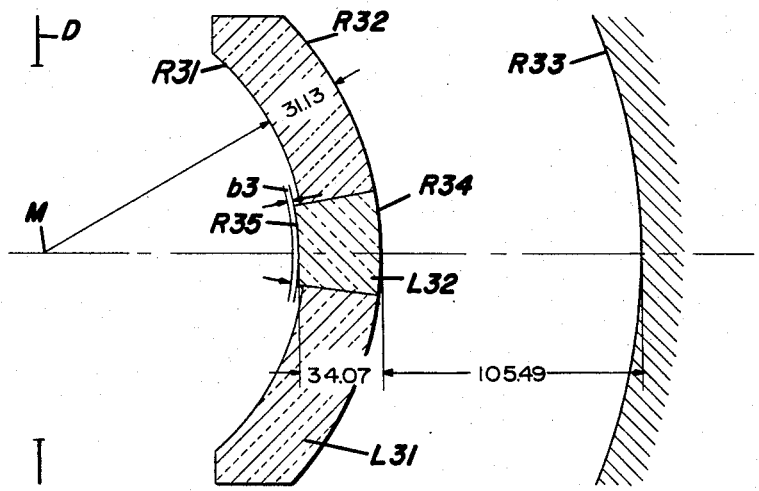
Figure 4:
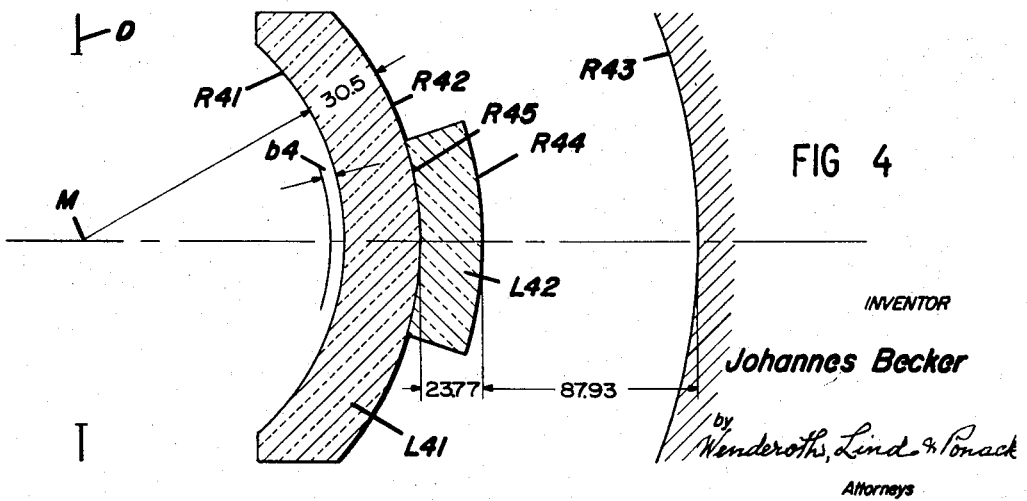

FIGURES 3, 4 and 5 show three embodiments of the optical system according to my previous application Serial No. 708,691 to which the present invention may be applied. All three systems are purely concentric, that is, the centers of curvature of the surfaces (R31, R32, R34, R35 in FIG. 3; R41, R42, R44, R45 in FIG. 4; R51, R52, R54, R55 in FIG. 5) of the meniscus lenses (L31, L32 in FIG. 3; L41, L42 in FIG. 4; L51, L52 in FIG. 5)

coincide with each other and with the center of curvature M of the concave mirror (R33 in FIG. 3; R43 in FIG. 4; R53 in FIG. 5). D in the figures denotes the diaphragm located at the center M, while b3, b4 and b5 in FIGURES 4 and 5, respectively is the unobstructed distance defined in the foregoing.

In FIGURE 3 the second meniscus lens L32 is mounted in a central perforation of the first meniscus lens L31 in such a way that it projects towards the center M.

FIGURE 4 gives an example of a system in which a second meniscus lens L42 is cemented to the convex surface R42 of the first menscus lens L41 which is traversed twice by the light rays.

In the two FIGURES 3 and 4 the first meniscus lens is situated on the same side of the center M as the concave mirror R33 or R43, respectively.

On the other hand, in FIGURE 5 the first meniscus lens L51 and the concave mirror R53 are mounted on either side of M, while a plane mirror R54 is placed in the most convergent (divergent) beam. This plane mirror R54 ensures that the near conjugate surface (e.g. the image surface, in cases where the system is used as a camera objective) is positioned close to the concave mirror. It is easy, for instance, to incorporate in this surface the photo-sensitive element of a television pick-up tube or the photo-cathode of an image amplifier tube, the tubes being passed for this purpose through a hole (not shown) in the concave mirror.

The dotted lines in FIG. 5 show that the first meniscus may, by way of alternative, be mounted on the other side of M (L'51). It will be understood that this, thanks to the concentricity of the system, has no effect whatsoever on the imagery. The data given below thus apply equally to the latter case, with the exception of the signs for the radii of curvature R51 and R52.

It will be understood that though in the system of FIG. 5 the centers of curvature of the surfaces of the second meniscus corrector lens L52 do not coincide at M in a purely geometrical sense due to the presence of the plane mirror R54 these surfaces are nevertheless concentric with the spherical mirror R53 in an optical sense, the mirror R54 having no other object than to fold the light rays travelling from the spherical mirror R53 towards the short conjugate surface.

The data of the systems according to FIGURES 3, 4 and 5 are as follows:

[Figure 3; $f=100$; $f/0.67$]

| Element | Radius of curvature | Thickness or distance | Refractive index and Abbe number |
|---|---|---|---|
| Meniscus L31 | R31=−104.37 | | |
| | R32=−135.50 | 31.13 | $n_d$=1.571   $\nu$=57.7 |
| Mirror R33 | R33=−240.99 | 105.49 | |
| | R34= 135.50 | 105.49 | |
| Meniscus L32 | R35= 101.43 | 34.07 | $n_d$=1.571   $\nu$=57.7 |
| | | b3=1.4 | |

[Figure 4; $f=100$; $f/0.7$]

| Element | Radius of curvature | Thickness or distance | Refractive index and Abbe number |
|---|---|---|---|
| Meniscus L41 | R41=−106.0 | | |
| | R42=−136.5 | 30.5 | $n_d$=1.571   $\nu$=57.7 |
| Mirror R43 | R43=−248.2 | 111.7 | |
| | R44=160.27 | 87.93 | |
| Meniscus L42 | R45=136.5 | 23.77 | $n_d$=1.571   $\nu$=57.7 |
| | | b4=5.8 | |

[Figure 5; $f=100$; $f/0.8$]

| Element | Radius of curvature | Thickness or distance | Refractive index and Abbe number |
|---|---|---|---|
| Meniscus L51 | R51=121.09 | | |
| | R52=97.06 | 24.03 | $n_d$=1.517   $\nu$=64.2 |
| Mirror R53 | R53=−230.74 | 327.80 | |
| Mirror R54 | R54=∞ | 85.15 | |
| | R55=121.44 | 20.5 | |
| Meniscus L52 | R56=101.20 | 20.24 | $n_d$=1.620   $\nu$=60.4 |
| | | b5=1.2 | |

FIGURE 6 illustrates a system similar to that of FIGURE 5 but to which, in accordance with my present invention, a conical lens has been added as a simple and efficient means to further minimize the spherical aberrations. Of course, the system of FIGURE 6 is merely shown to illustrate the principle of the present invention and it will be readily recognized by those skilled in the art that conical lenses may be added to the same effect to systems e.g. constructed in accordance with each of the FIGURES 3 and 4.

The system of FIGURE 6 comprises:

The concave spherical front surface mirror R63;

A first meniscus lens L61 concentric with the mirror R63;

The plane secondary mirror R64;

A second meniscus lens L65 traversed by the convergent beam reflected by the mirror R63 and concentric to the point M' which is the reflected image of the center M of the system in plane mirror R64;

The cone lens 1 placed at or near the center of curvature M and having a flat front surface and a conical rear surface whose apex angle differs only very little from 180°.

The image surface 2 is spherically curved.

The elements L61, L65 and 1 are cooperative in eliminating the spherical aberration of the mirror R63. The plane mirror R64 has for its sole purpose to fold the light rays but is not effective on spherical aberration.

The system consisting of the mirror R63 and the two meniscus lenses L61 and L65 can be calculated such that the curve representing the residual spherical aberration is very near to a straight line for an outer zone of considerable width. See the graph of FIGURE 7 which illustrates the lateral spherical aberration $\rho$ as a function of the height of incidence $h$ for the system shown in FIGURE 6. The optical data of this system are given in the table below.

[Figure 6; $f=100$; $f/0.8$]

| Element | Radius of Curvature | Thickness or distance | Refractive index and Abbe number |
|---|---|---|---|
| Meniscus L61 | R61=99.02 | | |
| | R62=124.66 | 25.64 | $n_d$=1.517   $\nu$=64.2 |
| Mirror R63 | R63=232.12 | 107.47 | |
| Mirror R64 | R64=∞ | 79.65 | |
| | R65=130.53 | 21.94 | |
| Meniscus L65 | R66=103.69 | 26.84 | $n_d$=1.517   $\nu$=64.2 |
| | | b6=2.9 | |

The cone lens 1 is made of glass having $n_d$=1.523; $\nu$=59.6 and has an apex-angle of 179°37'.

In the graph, FIGURE 7, the lateral error $\rho$ has been plotted against a linear scale for the reduced height of incidence $h'$ whereas the ordinate axis is calibrated in values of the height of incidence $h$. The term "reduced height of incidence" of a light ray is used herein to indicate the height at which the ray intersects the principal plane on the short conjugate side.

If the distance between this principal plane and the paraxial focus is $f'$ and $u'$ is the angle between the ray and the optical axis in the short conjugate space, we have as shown in FIGURE 8:

$$h' = f' t n u'$$

The sine condition indicates that $$\frac{h}{f'} = \sin u'$$

wherein $h$ is the height of incidence. Substituting $f'$ we have:

$$h' = \frac{h}{\cos u'}$$

showing the relation between $h$ and $h'$.

The reason for linearly plotting $\rho$ against $h'$ rather than $h$ is that image planes slightly out of paraxial focus can be represented in the graph by straight lines through the origin O of the coordinate system. If we consider an image point free from spherical aberration then the "aberration curve" will coincide with the $h'$ axis for an image plane which is in focus because in that case, $\rho$ will be zero for all values of $h'$. If the image plane is now displaced out of focus an "aberration" $\rho$ will appear which is proportional to the value of $h'$ for the respective light rays. This is equivalent to a rotation of the $h'$-axis about O.

The curve 3 in FIGURE 7 has between the heights of incidence 31.25 and 62.5 (corresponding to relative apertures of $f/1.6$ and $f/0.8$, respectively) a portion which is very near to a straight line. If a straight line 4 is drawn through the origin O of the coordinate system which is parallel to the straight portion of the curve 3, this line apparently represents a point on the optical axis slightly outside the paraxial focus in which the light rays between the heights 31.25 and 62.5 have a substantially constant lateral spherical aberration $\rho_c$ as indicated in the drawing. In other words, at this point of the optical axis all the light rays between the heights of incidence indicated are focussed to a rather sharply defined ring shaped image surrounding the optical axis and having a radius $\rho_c$. At this position I provide the image surface. In order to let this ring shaped image "shrink" to a small dot (the image "point") on the optical axis the cone lens 1 is provided. This lens is positioned substantially at the center of curvature M of the system which is also the diaphragm position, and is traversed by the essentially parallel light rays arriving from the long conjugate.

The light rays parallel to the optical axis are deviated by the cone lens a constant small angle towards the optical axis. This has for effect that the point in which each individual light ray strikes the image surface, is shifted towards the optical axis a small distance substantially equal to the radius of the above mentioned ring. This distance is, in good approximation, equal for all light rays as their angle of deviation by the cone lens is constant.

In still other terms, the present invention proposes:

(a) Selecting a pair of meniscus lenses in such a manner that the resultant under correction for lateral spherical aberration, throughout a large part of the aperture varies substantially linearly with the reduced height of incidence;

(b) Selecting a position for the image surface outside the paraxial focus where all the light rays of the above mentioned part of the aperture have a substantially constant under correction for lateral spherical aberration;

(c) Adding by means of a cone lens to all such light rays an equal amount of lateral over correction for spherical aberration which compensates for the residual under correction in the selected plane.

It will be noticed that the light rays having a height of incidence lower than 31.25 do not focus in the ring shaped image as their lateral aberration in the image surface is smaller than $\rho_c$. Hence, such light rays cannot be brought to focus by the cone lens. It will be remembered, however, that in optically aligned mirror systems such near-axial rays are of no interest due to their being intercepted by the central obstruction which in the example shown in FIGURE 6 is formed by the secondary mirror R64. In the systems of FIGS. 3 and 4 the central obstruction is formed by the image surface.

As the amount of under correction $\rho_c$ to be eliminated by the cone lens may be very small in the system of the invention, the deviation of that lens from a plane-parallel plate is extremely small. In the example shown the apex angle of the conical surface is 179°37'. It will be clear that the influence of such a nearly flat cone lens on oblique beams is negligibly small.

It is known to provide in a catadioptric system a pair of meniscus lenses in combination with a so called Schmidt plate. However, the necessary aspheric figuring of the Schmidt plate to the high precision involved requires a large amount of skilled labor and makes the prior system expensive. According to the invention, by carefully selecting the two meniscus lenses it is made possible to use for elimination of residual spherical aberration a nearly flat cone lens which is relatively inexpensive and easy to make and whose influence on oblique beams is negligible.

It is of course understood that various well known elements may be added to the systems above described for purposes other than spherical aberration correction and not impairing the state of spherical correction obtained solely by the two meniscus lenses and the cone lens. For example, plane mirrors such as the secondary mirrors R54 and R64 shown in FIGURES 5 and 6, respectively, or other plane mirrors positioned at any point of the system for bending or folding the path of the light rays may be added with no effect on the correction of spherical aberration. Also there may be added well known plane-parallel transparent elements such as plane-parallel color correcting plates or window or filter glasses at such positions in the system where they do not influence the state of correction of spherical aberration obtained by the two meniscus lenses and the cone lens.

I claim:

1. An optical system for the imagery of conjugate surfaces comprising in optical alignment, a concave spherical front surface mirror, a first meniscus lens axially air spaced from said spherical mirror and having spherical surfaces substantially concentric with said spherical mirror, said first meniscus lens being positioned in front of said spherical mirror to be traversed by light rays travelling between the long conjugate surface and said spherical mirror, a second meniscus lens having likewise spherical surfaces substantially concentric with said spherical mirror, said second meniscus lens being positioned to be traversed only by the light rays travelling between said spherical mirror and the short conjugate surface, said first and second meniscus lenses introducing over correction for spherical aberration, the ratio at the maximum height of incidence of the higher orders of spherical aberration to the third order of spherical aberration being substantially lower for said second meniscus lens than for said first meniscus lens, said first and second meniscus lenses correcting the spherical aberration of said spherical mirror with the exception of a residual amount of under correction, and a conical lens having at least one surface in the shape of a circular cone and being located substantially in the center of curvature of said spherical mirror, said conical lens substantially compensating for said residual amount of under correction.

2. An optical system as claimed in claim 1 wherein said first meniscus lens is so positioned between the center of curvature of said spherical mirror and said spherical mirror as to be traversed twice, once by the light rays travelling between said long conjugate surface and said spherical mirror and once by the light rays travelling between said spherical mirror and said short conjugate surface.

3. An optical system as claimed in claim 2, wherein said second meniscus lens is cemented to one of the surfaces of said first meniscus lens.

4. An optical system as claimed in claim 1, wherein said first meniscus lens is positioned between said center of curvature of said spherical mirror and said spherical mirror and has a thickness smaller than $0.3f+b$, wherein $f$ is the equivalent focal length of the optical system and $b$ the air space between the short conjugate surface and the surface of said first and second meniscus lenses having the smallest radius of curvature.

5. An optical system for the imagery of conjugate surfaces, comprising in optical alignment from the long conjugate surface towards the short conjugate surface, a first meniscus lens having substantially concentric spherical surfaces and facing with its concave surface said long conjugate surface, said first meniscus lens being provided with a central aperture, a concave spherical mirror axially spaced from said first meniscus lens and being substantially concentric with said surfaces of said first meniscus lens, a second meniscus lens positioned in front of said spherical mirror and axially spaced from said spherical mirror, said meniscus lens having substantially concentric surfaces which are also substantially concentric with said spherical mirror and being mounted in said central aperture of said first meniscus lens, whereby the light rays travelling between the long conjugate surface and said spherical mirror traverse said first meniscus lens and travelling between said spherical mirror and the short conjugate surface traverse said second meniscus lens, said first and second meniscus lenses correcting the spherical aberration of said spherical mirror with the exception of a residual amount of under correction, and a conical lens having at least one surface in the shape of a circular cone and being located substantially in the center of curvature of said spherical mirror, said conical lens substantially compensating for said residual amount of under correction.

6. An optical system as claimed in claim 5, wherein said concave surface of said first meniscus lens has a radius of curvature exceeding that of the concave surface of said second meniscus lens.

7. An optical system as claimed in claim 5, wherein said second meniscus lens has a thickness exceeding that of said first meniscus lens.

8. An optical system for the imagery of conjugate surfaces comprising in optical alignment, a concave spherical front surface mirror, a first meniscus lens axially spaced from said spherical mirror and having spherical surfaces substantially concentric with said spherical mirror, said first meniscus lens being positioned in front of said spherical mirror to be traversed by light rays travelling between the long conjugate surface and said spherical mirror, a plane mirror positioned in front of and facing said spherical mirror to reflect light rays travelling between said spherical mirror and the short conjugate surface, and a second meniscus lens having spherical surfaces positioned to be traversed only by said light rays reflected by said plane mirror, the mirror images of said surfaces of said second meniscus lens in said plane mirror being substantially concentric with said spherical mirror and said first and second meniscus lenses correcting the spherical aberration of said spherical mirror with the exception of a residual amount of under correction and a conical lens having at least one surface in the shape of a circular cone and being located substantially in the center of curvature of said spherical mirror, said conical lens substantially compensating for said residual amount of under correction.

9. In an optical system for the imagery of conjugate surfaces comprising a concave spherical front surface mirror, means to correct for the spherical aberration of said spherical mirror consisting in a first meniscus lens in optical alignment with said spherical mirror and axially air spaced therefrom, said first meniscus lens having spherical surfaces substantially concentric with said spherical mirror and being positioned in front of said spherical mirror to be traversed by light rays travelling between the long conjugate surface and said spherical mirror, a second meniscus lens having likewise spherical surfaces substantially concentric with said spherical mirror, said second meniscus lens being positioned to be traversed only by the light rays travelling between said spherical mirror and the short conjugate surface, and a conical lens having at least one surface in the form of a circular cone and being located substantially in the center of curvature of said spherical mirror, said first and second meniscus lenses introducing over correction of spherical aberration, the ratio of the zonal over correction at the maximum height of incidence to the over correction at a lower height of incidence being substantially smaller for said second meniscus lens than for said first meniscus lens, said first and second meniscus lenses correcting the spherical aberration of said spherical mirror except for a residual amount of under correction, and said conical lens substantially compensating for said residual amount of under correction.

10. In an optical system for the imagery of conjugate surfaces comprising a concave spherical front surface mirror, means to correct for the spherical aberration of said spherical mirror consisting in a first meniscus lens in optical alignment with said spherical mirror and axially air spaced therefrom, said first meniscus lens having spherical surfaces substantially concentric with said spherical mirror and being positioned in front of said spherical mirror to be traversed by light rays travelling between the long conjugate surface and said spherical mirror, a second meniscus lens having likewise spherical surfaces substantially concentric with said spherical mirror, said second meniscus lens being positioned to be traversed only by the light rays travelling between said spherical mirror and the short conjugate surface, and a conical lens having at least one surface in the form of a circular cone and being located substantially in the center of curvature of said spherical mirror, said first and second meniscus lenses introducing over correction of spherical aberration and correcting the spherical aberration of said spherical mirror with the exception of a residual under correction which varies substantially linearly with the reduced zonal height of incidence in a peripheral part of the aperture of the system, and said conical lens deviating light rays entering parallel to the axis of the system in said peripheral part of the aperture a constant angle to thereby compensate for said residual spherical aberration.

No references cited.